United States Patent Office.

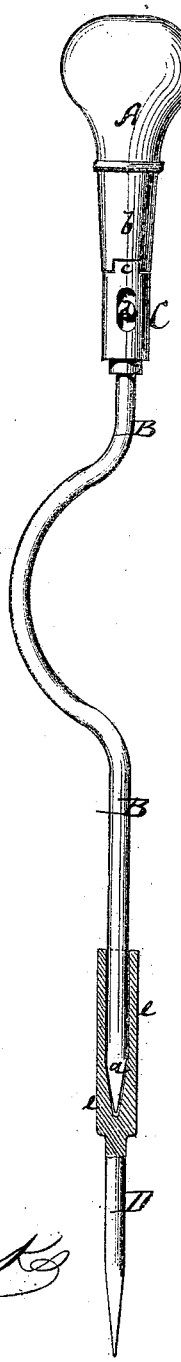

DAVID DRUMMOND, OF McGREGOR, IOWA.

Letters Patent No. 98,933, dated January 18, 1870.

IMPROVEMENT IN SCREW-DRIVER.

The Schedule referred to in these Letters Patent and making part of the same

To all whom it may concern:

Be it known that I, DAVID DRUMMOND, of McGregor, in the county of Clayton, and State of Iowa, have invented a new and improved Screw-Driver; and I do hereby declare that the following is a full, clear, and exact description thereof, which will enable others skilled in the art to make and use the same, reference being had to the accompanying drawing, forming part of this specification.

The drawing represents a side view, partly in section, of my improved screw-driver.

This invention has for its object to so construct a screw-driver that it may be revolved like a brace, or in the ordinary manner, by revolving the handle.

The invention consists, chiefly, in so securing the handle that it may be swivelled, or locked rigidly to the shank of the tool, by means of a sliding ferrule.

The invention also consists in adapting the same handle to different tools, by forming hollow shanks on such other tools, which will fit upon the end of the main screw-driver.

A, in the drawing, represents the handle of my improved screw-driver. It is swivelled to the upper end of the shank B, of the screw-driver, so that it can freely revolve on the same.

The shank B has a crook or crank in it, similar to that of a brace, although, perhaps, less far bent out. The tool $a$, on the end of the shank, can, therefore, be revolved rapidly, while the handle is held stationary.

The ferrule $b$, of the handle, has its edge recessed, to receive lips $c$, projecting from a sliding ferrule, C. The latter is a tube fitted upon the shank B, and held in place by pins $d$, which project from the shank through slots of the tube, as shown.

When the slide C is pushed toward the handle, to lock its lips $c$ into the recesses of the ferrule $b$, as in the drawing, the handle will be locked to the shank, and can be used to turn the tool, like every ordinary screw-driver.

To the tool $a$ may be secured any other tool, D, by providing on the latter a tubular shank, $e$, which has a flattened tapering bore, to fit the tool $a$, as shown.

One shank and handle can thus be used for a number of tools.

Having thus described my invention,

I claim as new, and desire to secure by Letters Patent—

A screw-driver, formed of the several parts specified, and all constructed and fitted together in the manner set forth.

DAVID DRUMMOND.

Witnesses:
H. H. BARNES,
H. D. EVANS.